United States Patent [19]

Bougis

[11] Patent Number: 5,550,883
[45] Date of Patent: Aug. 27, 1996

[54] VESSEL OF A NUCLEAR REACTOR, INCLUDING MEANS FOR HOLDING ITS LOWER INTERNALS AND METHOD OF ADJUSTING THE HOLDING MEANS

[75] Inventor: Jean-Claude Bougis, Courbevoie, France

[73] Assignee: Framatome, Courbevoie, France

[21] Appl. No.: 404,434

[22] Filed: Mar. 15, 1995

[30] Foreign Application Priority Data

Mar. 15, 1994 [FR] France .................. 94 03004

[51] Int. Cl.⁶ .................................................. G21C 9/00
[52] U.S. Cl. .................... 376/302; 376/461; 376/303; 376/453
[58] Field of Search .................. 376/302, 461, 376/287, 285, 303, 453, 450, 202; 976/DIG. 181, DIG. 104

[56] References Cited

U.S. PATENT DOCUMENTS

| | | | |
|---|---|---|---|
| 4,008,757 | 2/1977 | Weatherford, Jr. | 165/67 |
| 4,080,255 | 3/1978 | Rylatt | 376/290 |
| 4,135,974 | 1/1979 | Garkisch et al. | 376/302 |
| 4,194,948 | 3/1980 | Ledin | 376/364 |
| 4,318,776 | 3/1982 | Proll et al. | 376/254 |
| 4,657,730 | 4/1987 | Blaushild et al. | 376/285 |
| 4,717,527 | 1/1988 | Gjertsen et al. | 376/209 |
| 4,752,436 | 6/1988 | Snyder | 376/285 |
| 4,756,877 | 7/1988 | Veronesi et al. | 376/362 |
| 5,257,295 | 10/1993 | Chevereau et al. | 376/302 |

FOREIGN PATENT DOCUMENTS

| | | |
|---|---|---|
| 0251822 | 1/1988 | European Pat. Off. . |
| 2585870 | 2/1987 | France . |
| 2586320 | 2/1987 | France . |

Primary Examiner—Charles T. Jordan
Assistant Examiner—Meena Chelliah
Attorney, Agent, or Firm—Pollock, Vande Sande & Priddy

[57] ABSTRACT

The vessel of the nuclear reactor includes at least three assemblies (22) distributed around the periphery of the core support plate (25), each comprising a key (26) fixed to the inner surface of the wall (21) of the vessel at the core support plate (25) and a cut-out (29) in the external edge of the core support plate (25) and open towards the outside in order to receive, with a clearance, an end part (30) of the key (26). The cut-out (29) includes an upper surface (29d) perpendicular to the axis of the wall (21) of the vessel and of the lower internals (23), which is machined in the core support plate (25) in order to retain the internals (23) in the event of a drop. A keyhole slot (28) is fixed inside the cut-out (29). In order to carry out the adjustment of the dimensions of the keyhole slot (28), a standard keyhole slot may be used, equipped with distance measurement sensors in order to obtain the desired clearances between the key (26) and the keyhole slot (28).

10 Claims, 6 Drawing Sheets

VESSEL OF A NUCLEAR REACTOR, INCLUDING MEANS FOR HOLDING ITS LOWER INTERNALS AND METHOD OF ADJUSTING THE HOLDING MEANS

FIELD OF THE INVENTION

The invention relates to a vessel of a pressurized-water nuclear reactor, including means for holding and supporting internals of the vessel.

BACKGROUND OF THE INVENTION

Pressurized-water nuclear reactors include a vessel, having a generally cylindrical barrel arranged with its axis vertical in the service position of the vessel and closed by a domed bottom head at its lower end.

The reactor core formed by juxtaposed fuel assemblies is placed inside the vessel in which, during the operation of the nuclear reactor, the reactor coolant flows, coming into contact with the core fuel assemblies in order to cool them and to transfer the heat produced by the core.

The nuclear reactor vessel contains internal equipment, called lower internals, for supporting and holding the core fuel assemblies inside the vessel.

These lower internals include, a cylindrical barrel arranged in a coaxial manner with respect to the vessel and a very thick core support plate integral with the lower end of the barrel.

The core barrel is suspended inside the vessel by its upper part and contains a baffle system fixed to the inner surface of the core barrel, making it possible to hold the fuel assemblies which rest on a lower core support plate by their lower part.

In order to prevent movements of the lower internals suspended by the core barrel inside the reactor vessel, devices are used for holding these internals making it possible to prevent, or to limit to a very low value, the movements of the lower part of the internals in radial and tangential directions.

In order to confront any accidental situation, devices are also used making it possible to retain the reactor lower internals, in the highly improbable situation in which a rupture of the core barrel occurs. The elements for retaining the internals may be made in the form of supporting means preventing the lower internals inside the vessel from dropping by an amount which would permit the centering pins for the core fuel assemblies to disengage from the centering and positioning orifices provided in the upper nozzles of the fuel assemblies.

Upper intervals arranged inside the vessel also include a lower part formed in the shape of an upper core plate into which are fixed fuel-assembly centering pins which have a part projecting beneath the upper core plate and which are engaged, during the installation of the upper internals inside the vessel, into openings made in the fuel-assembly nozzles. In this way, the fuel assemblies are so positioned, aligned and centered that a control rod assembly can be moved or lowered back down into them, in the event of a shutdown of the nuclear reactor.

The retention function of the lower internals in the event of rupture of the barrel is generally designated as a secondary supporting function, the internals and the core being supported, under normal conditions, by means of the core barrel which is suspended from the vessel, at the vessel flange onto which the vessel closure head is fixed.

In the case of the vessels of pressurized-water nuclear reactors which have been constructed according to the prior art and which are currently in operation, the two functions, namely the radial and tangential holding of the lower internals at the bottom part and the secondary supporting of these internals are provided by two entirely separate devices.

The lower internals are radially and tangentially held by keys which limit the rotational movements of the upper internals to a very small amount and which prevent the lower end of these internals from tilting.

The radial and tangential holding is achieved by means of six identical assemblies each comprising a key welded to the support bottom of the lower internals and a female part fixed onto the vessel and intended to receive, with a certain clearance, a part which projects towards the outside of the key. The female part itself comprises a solid piece welded to the internal wall of the vessel and keyhole slots for radially and tangentially holding the key which are fixed onto the solid piece by screws and positioning studs. The radial and tangential holding device allows the lower internals to move vertically inside the vessel and, in particular, allows the lower part of the internals to move vertically owing to expansions or contractions as the nuclear reactor is raised in temperature or is cooled.

The secondary supporting of the internals and of the reactor core, in the extremely improbable event of circumferential rupture of the core barrel, is provided by supporting columns fixed onto the lower face of the support bottom at one of their ends and onto the upper face of a fastener plate at their other ends, a base plate then bearing on the vessel bottom head and dampers fixed in an arrangement which is coaxial with respect to the supporting columns, these dampers being inserted between the lower fastener plate and the base plate.

The secondary support of the lower internals and of the core makes it possible to transfer and distribute, by means of the baseplate, the vertical forces on the vessel bottom head, to absorb the energy released by the drop of the lower internals and by the relaxation of the springs for holding the fuel assemblies in the event of rupture of the core barrel and to limit the vertical movement of the fuel assemblies in order to prevent the centering studs from disengaging, while at the same time, under normal operation, permitting movements which are due to differential expansion in the vertical direction between the lower internals and the vessel.

The radial holding devices according to the prior art, which include both keys fixed so as to project with respect to the peripheral part of the core support plate and keyhole slots fixed into a solid piece integral with the inner surface of the vessel are very bulky and disturb the flow of the cooling water inside the vessel.

The secondary supporting device for the internals is, moreover, relatively complicated.

Furthermore, during the installation on site of the nuclear reactor vessel, it is necessary to put the lower internals in place inside the vessel before the installation of the secondary support and of the radial holding keyhole slots.

A manhole is provided at the center of the support bottom in order to gain access to the vessel lower plenum, so as to measure the actual distance between the support bottom of the lower internals and the vessel bottom head as well as the relative positions in the circumferential and radial directions between the holding keys integral with the core support plate and the keyhole slot supports integral with the inner surface of the vessel.

Depending on the measurements, the machining of the base plate and of the keyhole slots are carried out in order to obtain, when cold, the desired clearances between the holding and supporting pieces.

After installing the baseplate and the keyhole slots, it is necessary to present the lower internals once again in order to check the clearances by gaining access via the manhole.

The operations necessary for installing the lower internals and their holding and supporting device are therefore lengthy and complicated and require the presence of a manhole in the central part of the support bottom.

SUMMARY OF THE INVENTION

The object of the invention is therefore to propose a vessel of a pressurized-water nuclear reactor which includes a wall of generally cylindrical shape, the axis of which is vertical in the service position of the vessel, closed by a domed bottom head at its lower end and containing a cylindrical barrel arranged coaxially with respect to the vessel and integral with a very thick core support plate at its lower part, the barrel and the core support plate which form lower internals of the reactor vessel being held in radial and tangential directions perpendicular to the axis of the vessel and, in the event of rupture of the barrel, by holding means in engagement with the core support plate, this vessel including holding means which are not very bulky and which have a simple structure and can be manufactured and adjusted by carrying out measurements not requiring the presence of an operator inside the vessel.

To this end, the means for holding the vessel internals according to the invention include at least three assemblies distributed around the periphery of the core support plate, each comprising:

- a key fixed onto the inner surface of the vessel at the core support plate, including an end part of prismatic shape arranged in the direction of the axis of the vessel, and
- a cut-out in that peripheral part of the core support plate which is open towards the outside in order to receive, with a clearance, the end part of the key, which cut-out is delimited by an upper surface perpendicular to the axis of the vessel and machined in the core support plate, so as to be able to interact with the end part of the key in order to retain the core support plate in the event of a drop.

In order that the invention may be better understood, a vessel equipped with holding means according to the prior art and a vessel according to the invention and according to several embodiments will now be described, by way of example, with reference to the herein appended figures.

DETAILED DESCRIPTION

Figure 1:
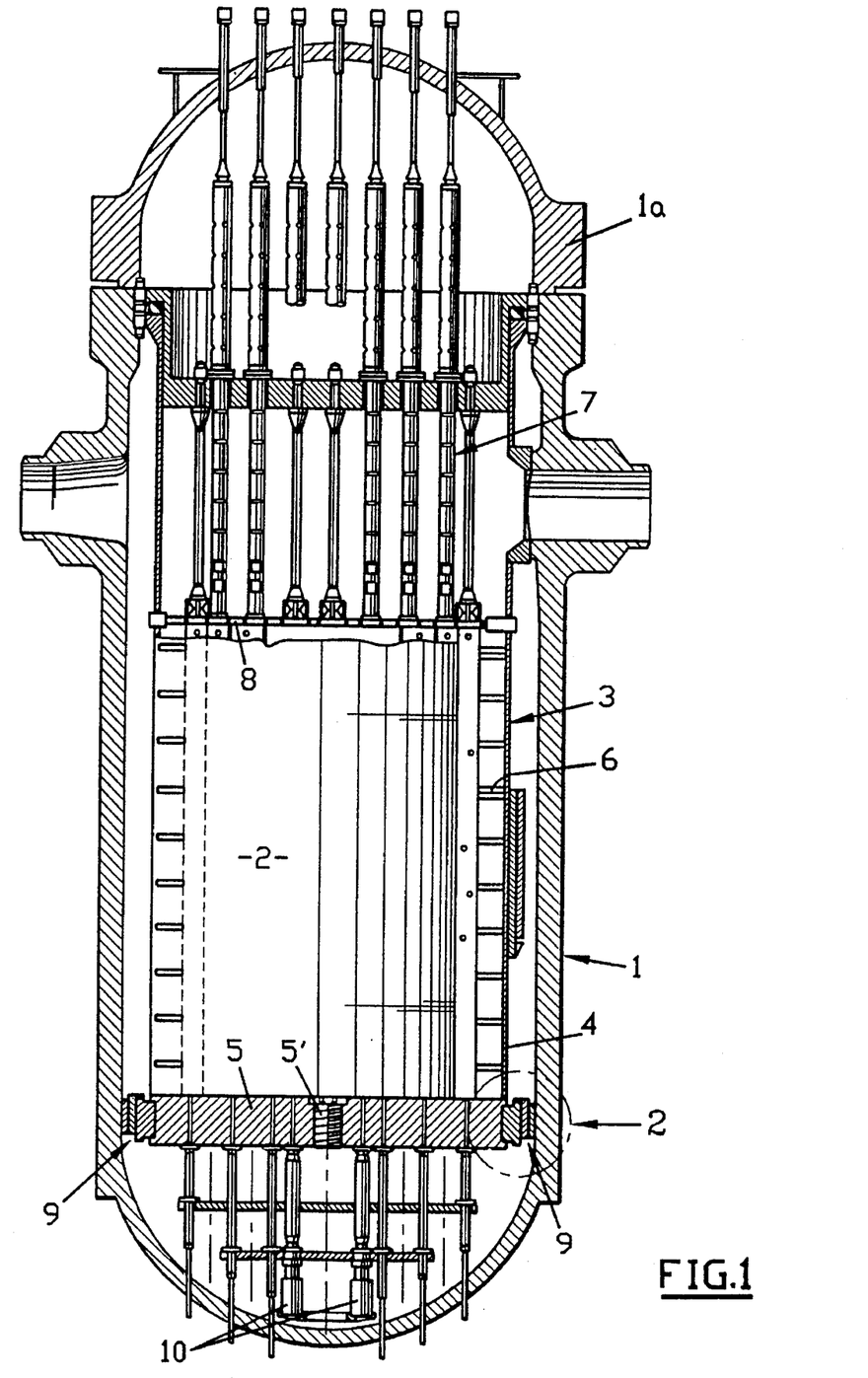
FIG. 1 is a sectional view, in an axial plane, of a vessel according to the prior art, of its internals and of their holding means.

FIG. 1 shows a vessel 1 of a pressurized-water nuculear reactor including a barrel of generally cylindrical shape which is arranged with its axis vertical in the service position of the vessel represented in FIG. 1.

Inside the vessel 1 is arranged the nuclear reactor core 2 formed by fuel assemblies of generally prismatic shape which are arranged inside internal equipment 3, called lower internals.

The lower internals include a core barrel 4 of generally cylindrical shape which is fixed inside the vessel 1 coaxially with respect to the vessel, and a core support plate 5 integral with the core barrel 4 at its lower part. A manhole, which may be closed by a screw-in plug 5', is provided in the center of the core support plate 5. It is thus possible to gain access to the vessel lower plenum.

The core barrel 4 contains a baffle system 6 intended to hold the fuel assemblies at the periphery of the core 2 inside the core barrel 4.

The vessel 1 also contains upper internals 7 which include an upper core plate 8 forming the lower part of the upper internals 7 and resting on the upper part of the fuel assemblies of the core 2 by means of springs.

The upper internals and the lower internals are suspended inside the vessel by their upper part which is fixed onto the upper shell of the vessel 1 slightly below the mating face of the vessel head 1a.

The lower internals are held at their lower part, at the core support plate 5, by radial holding devices 9, which will be described in more detail with reference to FIGS. 2 and 3.

Six radial holding devices 9 are generally used, these being distributed around the core support plate 5 in order to hold the lower internals against rotational movements about their axis or against excessive radial movement of the core support plate 5, under accident conditions, while at the same time allowing relative movements of the core support plate 5 and of the core barrel 4 in the axial direction of the vessel, for example under the effect of differential expansions.

Figure 4:
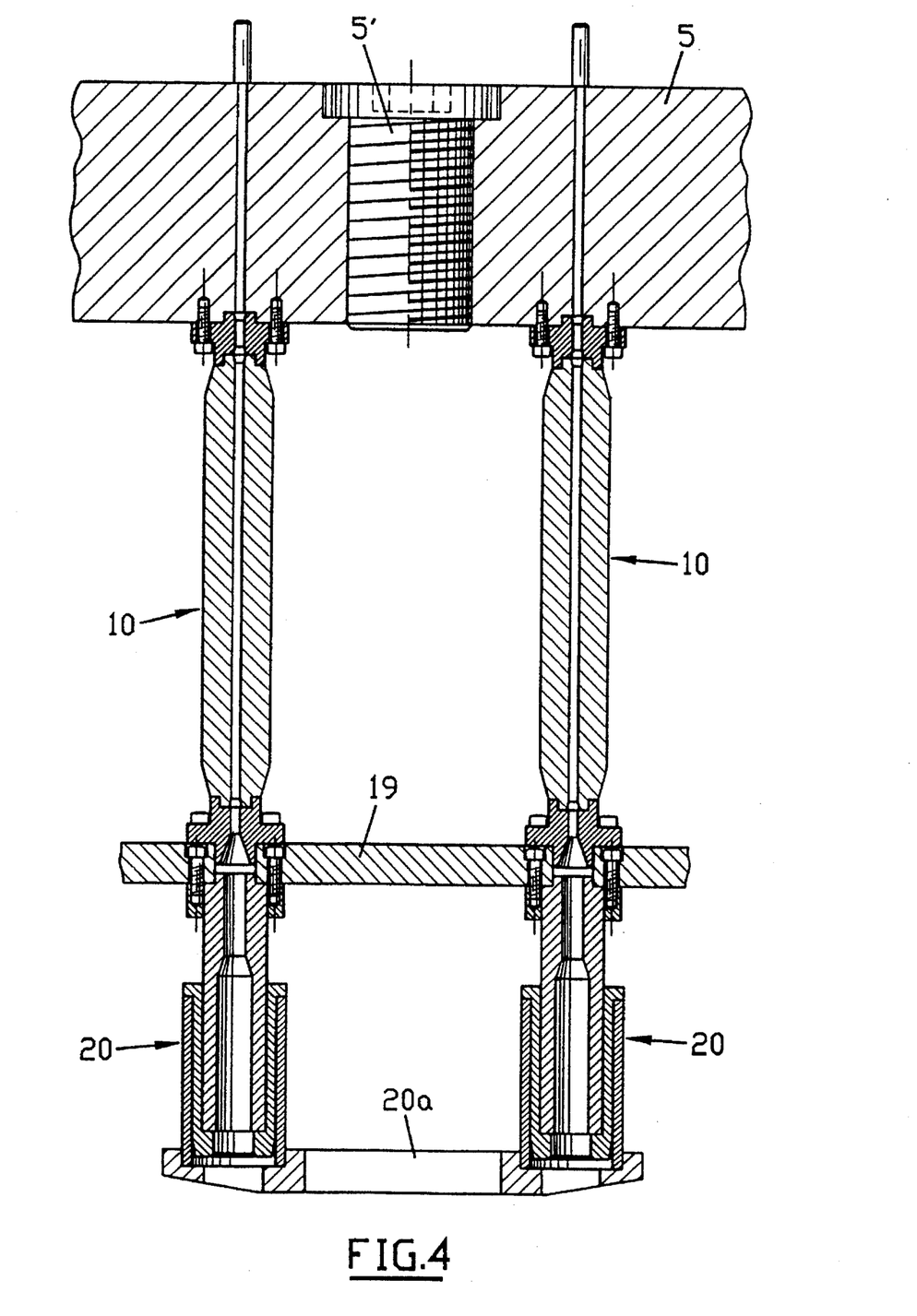
FIG. 4 is a view, on a larger scale, of part of FIG. 1 showing secondary supporting means for the lower internals of the vessel represented in FIG. 1.

Furthermore, support columns 10, which will be described in more detail with reference to FIG. 4, are inserted between the vessel bottom head and the core support plate 5.

Four columns 10 are generally arranged beneath the core support plate 5 so as, in the event of rupture of the core barrel 4, to prevent the lower internals 3 and the core 2 from dropping by an amount such that the centering pins integral with the upper core plate 8 disengage from housings provided in the upper nozzles of the fuel assemblies of the core 2.

Figure 2:
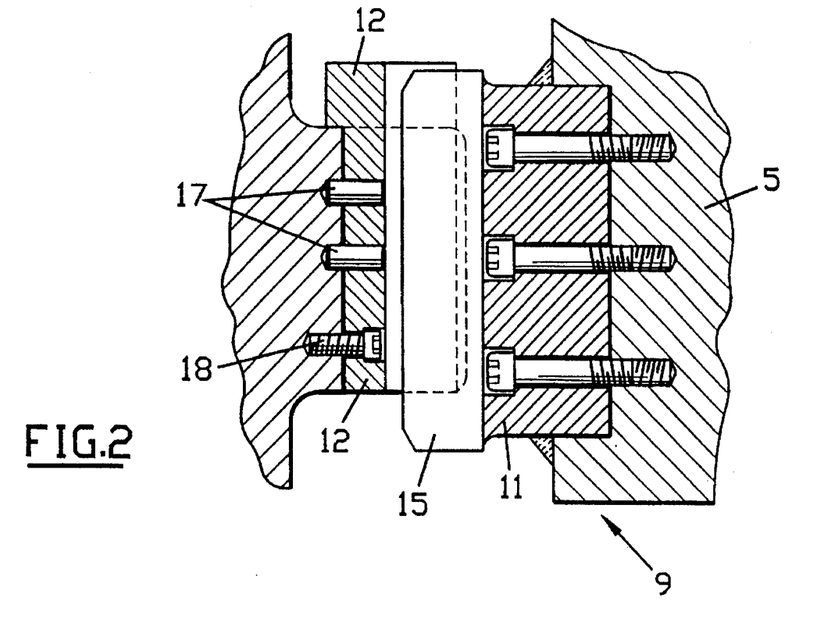
FIG. 2 is a view on a larger scale of the detail 2 of FIG. 1 representing a radial holding assembly for the lower internals of the vessel.
Figure 3:
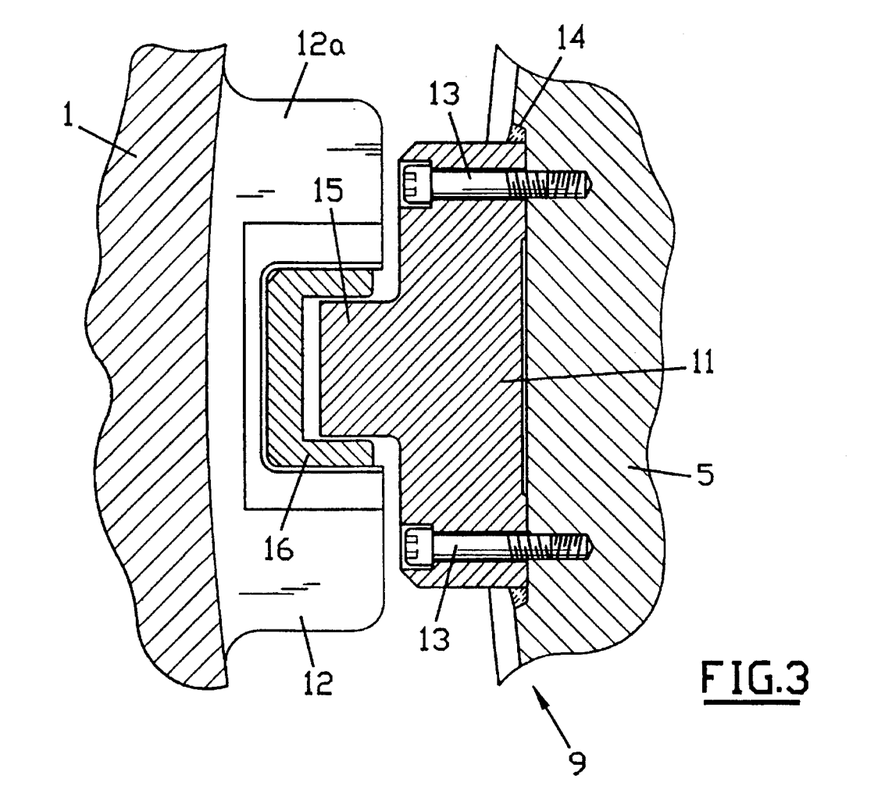
FIG. 3 is a sectional view, in a horizontal plane, of the radial holding assembly represented in FIG. 2.

As may be seen in FIGS. 2 and 3, each of the radial holding devices 9 includes a first, male; part 11 or key fixed onto the external peripheral edge of the core support plate 5 and a second, female; part fixed onto the inner surface of the vessel wall, opposite the male part 11. The key 11 is fixed by bolts 13 and by welds 14 inside a flat recess machined in the external peripheral edge of the core support plate 5. The key 11 includes, at its external end directed towards the inner surface of the wall of the vessel 1, a tongue 15 of substantially parallelepipedal shape, the longitudinal axis of which extends in the vertical direction corresponding to the axis of the vessel 1 and of the core barrel 4.

The female part 12 of the radial holding device 9 includes a solid support 12a fixed by a weld to the inner surface of the vessel 1 and a U-shaped keyhole slot 16 fixed by positioning studs 17 and bolts 18 inside a recess of parallelepipedal shape machined in the solid support 12a, called M support.

The tongue 15 of the key 11 is received inside the keyhole slot 16 with a small circumferential clearance and a greater radial clearance.

Generally, the circumferential clearances on either side of the lateral faces of the tongue 15 inside the keyhole slot 16 are of the order of 0.2 mm and the radial clearance between the outer end of the tongue 15 and the bottom of the keyhole slot 16 is 5 mm.

The small circumferential clearances make it possible to hold the core support plate 5 and the lower internals, preventing them from rotating about their axis, while at the same time permitting longitudinal movements necessitated, for example, by differential expansions between the lower internals and the vessel.

The radial clearance makes it possible to limit the relative movements between the lower internals and the vessel under accident conditions, while at the same time preventing the lower internals from jamming, by differential radial expansion, inside the vessel.

The key 11 is generally made of stainless steel, while the female part 12, including the keyhole slot 16, is made of a nickel alloy. The facing surfaces of the tongue 15 and of the keyhole slot 16 may be coated with a hard coating layer, for example with Stellite.

Because the female part 12 fixed onto the inner surface of the wall of the vessel 1 must be relatively massive in order to withstand the stresses which may be transmitted via the core support plate and via the key 11, and because the same applies to the key 11 fixed in an arrangement projecting radially with respect to the core support plate 5, the holding devices 9 for the vessel internals are bulky, in particular in the tangential direction.

Furthermore, these devices do not hold the lower internals in the event of a rupture of the core barrel.

For this purpose, it is necessary to use holding columns, such as represented in FIG. 4.

The columns 10, called secondary supporting columns, are each fixed at their upper part onto the lower face of the core support plate 5 and at their lower part onto a lower fastener plate 19 substantially parallel to the plate 5.

Dampers 20 are fixed in the extension of the columns 10, between the lower fastener plate 19 and a base plate 20a capable of bearing on the bottom head of the nuclear reactor vessel.

The dampers 20 include a body fixed onto the baseplate 20a and a piston connected via its upper part to the lower fastener plate 19.

Inserted between the damper body and the piston is a metal cylinder which undergoes tensile deformation in the event of dropping of the internals and the core, this being manifested by a movement in the vertical axial direction of the lower fastener plate 19 with respect to the base plate 20a resting on the bottom head of the nuclear reactor vessel. Plastic deformation of the metal cylinder inserted between the body and the piston of the dampers makes it possible to absorb the energy accompanying the drop of the lower internals. The base plate 20a makes it possible to transmit the forces to the bottom head of the nuclear reactor vessel.

The dampers make it possible to limit the forces which the structures withstand in the event of the lower internals dropping and, in particular, the compressive forces experienced by the columns 10.

Some of the instrumentation columns 10 which are penetrated over their entire length by a channel of axial direction may permit the passage of an instrumentation guide tube for carrying out neutron flux measurements or temperature measurements in the core.

The secondary support for the lower internals and for the core therefore requires the presence of relatively complicated additional elements.

Figure 5:
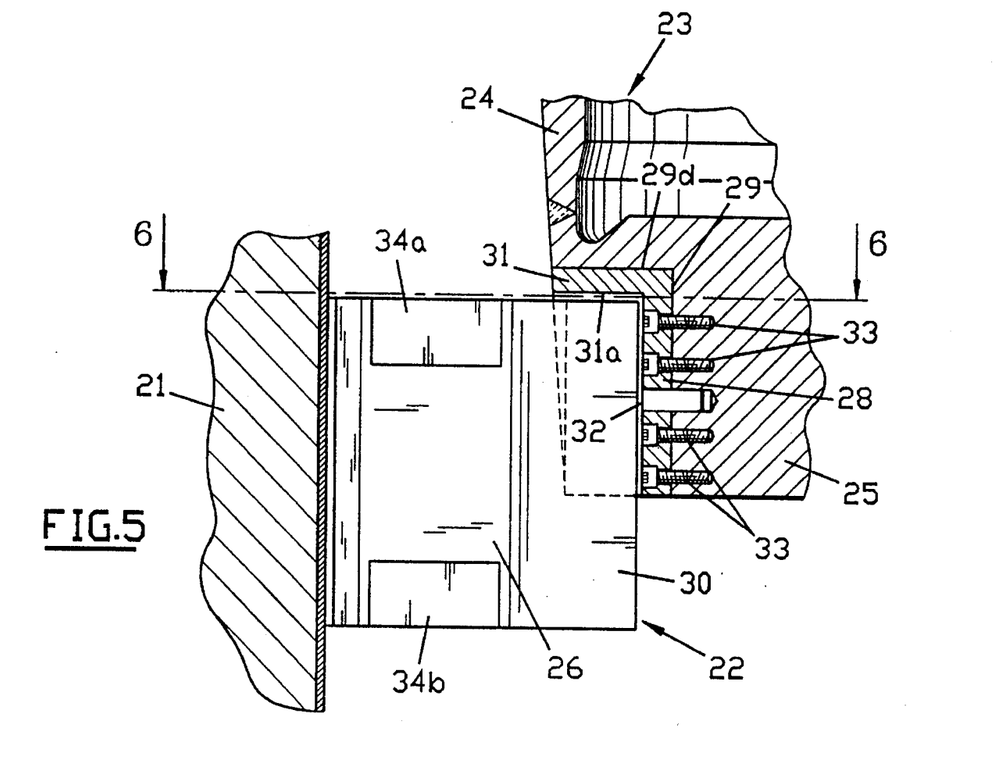
FIG. 5 is an elevation and sectional view, in a vertical plane, similar to the view of FIG. 2, showing an assembly of radial holding means for a vessel according to the invention.
Figure 6:
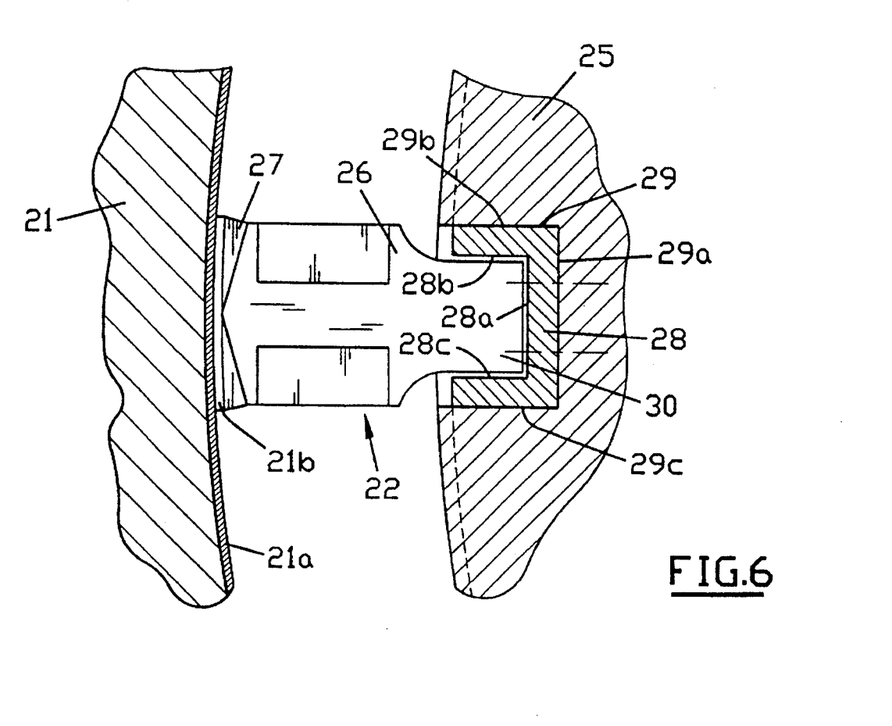
FIG. 6 is a view along 6—6 of FIG. 5.

Referring to FIGS. 5 and 6, a description will now be given of the means for holding the lower internals of a vessel of a nuclear reactor according to the invention against radial or circumferential movements and in the case of the internals and of the core dropping as a result of a rupture of the core barrel.

The nuclear reactor vessel according to the invention is similar to the vessel according to the prior art represented in FIG. 1, with the exception of the radial holding devices 9 and the columns 10, which are replaced by holding assemblies 22 providing all the radial and circumferential holding functions and the holding function in the event of the lower internals 23 dropping.

The lower internals 23 are arranged inside a vessel 21, the wall of which has a generally cylindrical shape, identical to that of the vessel 1 shown in FIG. 1.

The lower internals 23 include a core barrel 24 to the lower part of which a very thick core support plate 25 is fixed by welding.

Each of the holding devices 22 includes a male part or key 26 fixed by a weld 27 onto the inner surface of the wall of the vessel 21.

The female part of the holding device 22 is formed by a keyhole slot 28 fixed to the inside of a cut-out 29 machined in the peripheral part of the core support plate 25.

The key 26 includes an outer part directed towards the core support plate 25, intended to be engaged in the keyhole slot 28 and forming a tongue 30 of substantially parallelepipedal shape.

The cut-out 29 machined in the core support plate 25 and intended to receive the keyhole slot 28 includes four plane faces machined inside the core support plate 25. Three faces 29a, 29b and 29c of the cut-out 29 are parallel to the axis of the core barrel 24 and of the vessel, and a fourth face 29d, located at the upper part of the cut-out 29, is parallel to the faces of the support plate 25, i.e., perpendicular to the axis of the core barrel 24 and of the vessel 21.

The cut-out 29 is machined in the thickness direction of the core support plate 25, so as to emerge on the lower face of the plate 25. On the other hand, at its upper part, the cut-out 29 is closed by the face 29d.

The keyhole slot 28, fixed in the cut-out 29, includes a profiled part, the cross-section of which has the shape of a U, and the inner faces 28a, 28b and 28c of which are respectively parallel to the faces 29a, 29b and 29c of the cut-out. The keyhole slot 28 also includes a planar upper part 31 fixed into the upper part of the cut-out 29, against the upper face 29d.

The lower face 31a of the plate 31 of the keyhole slot 28 which is parallel to the faces of the core support plate 25 is directed towards the inside of the cut-out 29.

The keyhole slot 28 is fixed in the bottom of the cut-out 29 by positioning studs, 32, and by bolts 33, the heads of which are recessed with respect to the bearing faces of the keyhole slot.

The tongue 30 of the key 26 has dimensions such that it can be inserted into the housing of the keyhole slot 28 with a certain clearance with respect to each of the faces 28a, 28b, 28c and 31a of the keyhole slot. In the case of a conventional pressurized-water nuclear reactor, the clearance between the outer end face of the tongue and the bottom 28a of the keyhole slot is generally slightly greater than 4 mm, and the lateral clearances between the lateral sides of the tongue 30 and the lateral faces 28b and 28c of the keyhole slot are very small, of the order of 0.2 mm.

The clearance between the upper face of the tongue 30 and the upper face 31a of the keyhole slot 28 is of the order of 10 mm.

Six holding devices such as the device 22 are generally used, distributed around the core support plate 25.

It is thus possible to hold the core support plate 25 and the internals 23 containing the reactor core circumferentially with a very small clearance permitting longitudinal movements of the upper internals with respect to the vessel, for example in order to absorb differential expansions during the normal operation of the nuclear reactor.

The devices 22 also make it possible to prevent a large radial movement of the upper internals, in the case where the upper internals are subjected to stresses which are due to an accidental cause tending to move them radially of the vessel. The clearance between the end of the tongue 30 and the bottom of the key is, moreover, sufficient to prevent any jamming of the lower internals inside the vessel.

Furthermore, in the case of a rupture of the barrel 24 of the lower internals 23, after a very small vertical movement the lower internals 23 come into contact with the upper face of the tongues 30 of the keys 26, by means of the planar part 31 of the keyhole slot 28.

The keys 26 retain the lower internals before the centering pins of the upper core plate become disengaged from the nozzles of the fuel assemblies.

The keys 26, which are solidly fixed onto the inner surface of the vessel 21 by the weld 27, make it possible to withstand the force produced by the drop of the lower internals 23 and by their falling down onto the upper surface of the tongues 30. The welds 27 are made on a buttering layer 21b itself arranged on a stainless coating layer 21a covering the internal wall of the vessel 21.

The holding devices 22 of the vessel according to the invention have the advantage of comprising only the key 26 as the element extending into the annular space between the wall of the vessel 21 and the core support plate 25. The keyhole slot 28 is entirely housed in the cut-out 29 and is therefore completely inserted into the external peripheral contour of the core support plate 25.

This results in a much smaller overall size of the elements of the support devices in the annular space between the vessel and the peripheral surface of the core support plate 25 extended, at its upper part, by the core barrel 24.

The pressurized cooling water of the nuclear reactor, which flows in this annular space, consequently experiences a much smaller head loss than in the case of the radial holding devices according to the prior art.

Furthermore, it is possible to provide profiled parts 34a and 34b at the upper part and at the lower part of the body of the key 26 being placed in the annular space. The hydraulic profiles 34a and 34b of rounded shape make it possible to facilitate the flow of the water and to reduce the head loss to a low value.

In addition, the devices 22 retain the lower internals and the core in the event of rupture of the core barrel 24, so that it is not necessary to provide secondary supporting columns beneath the core support plate 25 in order to take up the forces on the vessel bottom head.

In the case of the vessel according to the invention, these forces are taken up directly by the cylindrical lateral wall 21 of the vessel.

Figure 7:
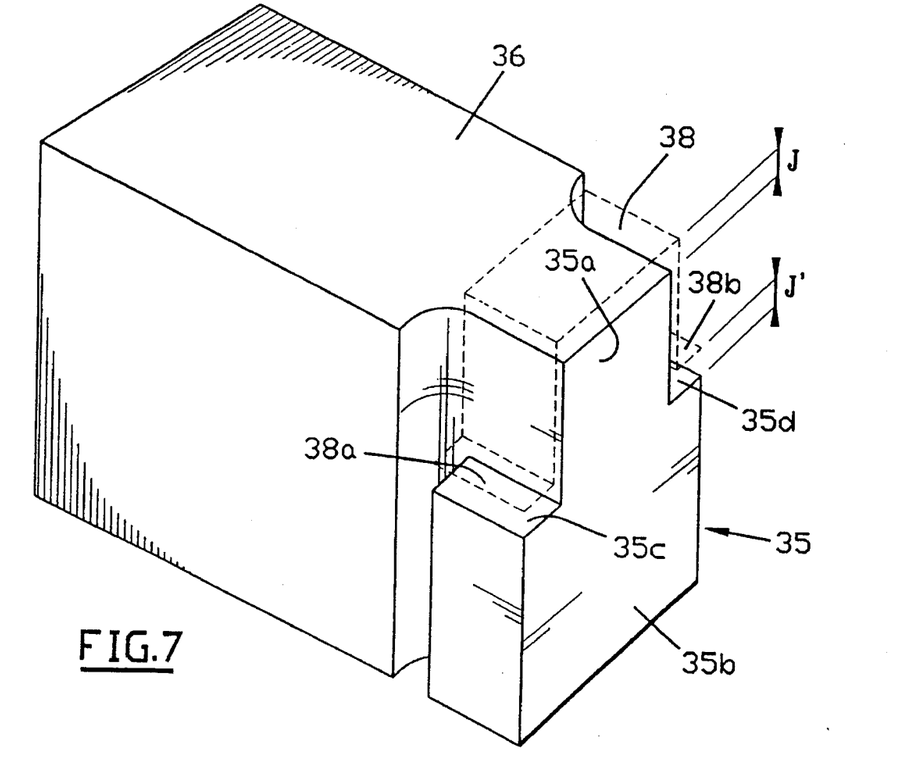
FIG. 7 is a perspective view of a key of a radial holding assembly according to a first embodiment of the invention.

FIG. 7 represents an alternative embodiment of a key 36 which may form part of a holding device of a vessel according to the invention, similar to the device 22 represented in FIGS. 5 and 6.

The key 36 includes a tongue 35 which has an upper part 35a having dimensions substantially similar to those of the tongue 30 of the key 26 represented in FIGS. 5 and 6, and a widened lower part 35b.

The upper part 35a of the tongue 35 may be engaged into a keyhole slot 38 similar to the keyhole slot 28 represented in FIGS. 5 and 6, with small circumferential clearances (of the order of 0.2 mm) and with a radial clearance with respect to the bottom of the key slightly greater than 4 mm.

The upper part 35a of the key is separated from the lower part 35b by two shoulders 35c and 35d parallel to the upper face of the key which is placed beneath the plane plate forming the upper part of the keyhole slot 38, with a clearance J of the order of 10 mm.

The keyhole slot 38 includes two outwardly projecting lateral parts 38a and 38b which are housed in two recesses on the lower face of the core support plate on either side of a main cut-out in the support plate, intended to receive part of the keyhole slot 38 which is substantially similar to the keyhole slot 28 and which receives the part 35a of the tongue 35 of the key 36.

The parts 35a and 35b of the tongue 35 are dimensioned so that the shoulders 35c and 35d lie beneath the lower surfaces of the parts 38a and 38b of the keyhole slot at a distance J' substantially equal to J, this distance generally being close to 10 mm.

In this way, in the event of a drop of the internals, the core support plate is retained not only by the upper surface of the tongue 35 but also by the widened shoulders 35c and 35d.

The lower internals and the core may therefore be retained on a surface extending over the entire width of the key 36 in the circumferential direction and not just over the width of the tongue 35a inserted into the keyhole slot 38.

Figure 8:
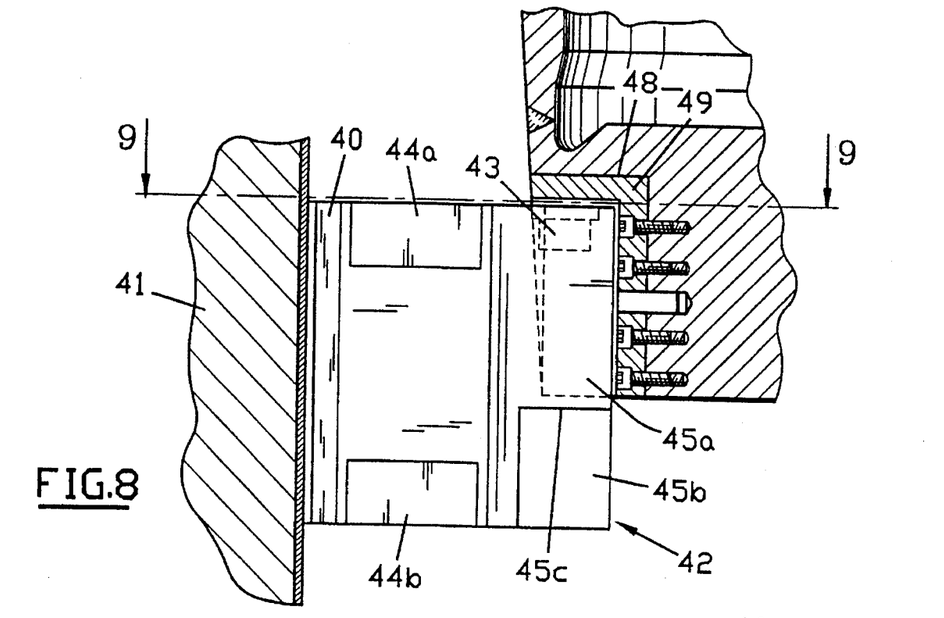
FIG. 8 is an elevation and sectional view, similar to the view of FIG. 5, showing a radial holding assembly for a vessel according to a second embodiment of the invention.
Figures 9, 10, 11:
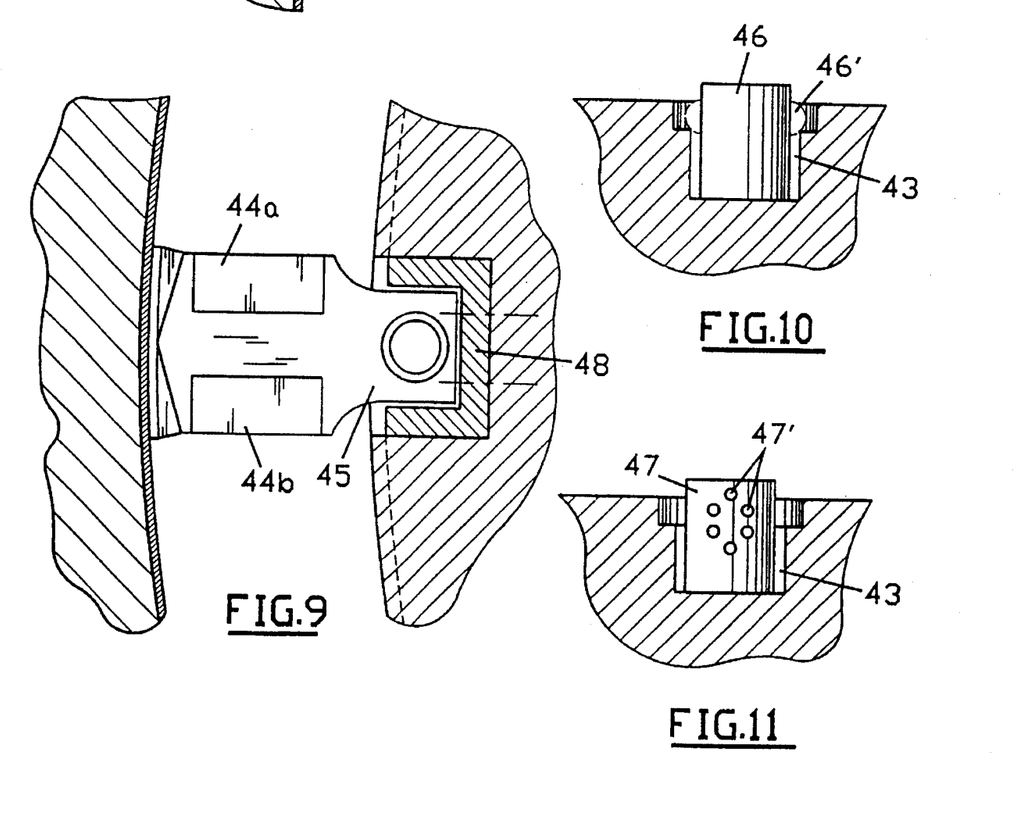
FIG. 9 is a sectional view along 9—9 of FIG. 8.
FIG. 10 is a sectional and elevation view of part of a holding assembly, such as represented in FIG. 8, including a damper device according to a first embodiment.
FIG. 11 is a view, similar to the view of FIG. 10, showing part of a radial holding assembly, including a damper according to a second embodiment.

FIGS. 8 and 9 represent a holding device 42 of a vessel according to the invention, the key 40 of which, fixed to the inner surface of the wall 41 of the vessel, is of the type represented in FIG. 7 and includes a tongue having an upper part 45a engaged into a keyhole slot 48 housed in a cut-out 49 in the core support plate, and a part 45b wider than the part 45a and including shoulders 45c which go beneath parts of the keyhole slot 48 housed in recesses machined in the lower face of the core support plate on either side of the cut-out 49.

In addition, the key 40 includes hydraulic profiles 44a and 44b at its upper part and at its lower part, in order to reduce the head loss of the water flowing in the annular space between the internal wall of the vessel 41 and the lower internals.

The upper part 45a of the tongue of the key 40 is placed inside the keyhole slot 48, with clearances with respect to the various faces of the keyhole slot which are identical to the clearances existing between the key 30 and the keyhole slot 28, as described above.

In addition, the part 45a of the tongue of the key 40 is machined to provide an axial cavity 43, including an upper part of large diameter and a lower part of smaller diameter, these being separated by a shoulder.

As may be seen in FIG. 10, a metal tubular piece 46, the axial length of which is greater than the depth of the cavity 43, is placed inside the cavity.

In the case of a drop of the lower internals of the nuclear reactor, those parts of the keyhole slot 48 located above the upper face of the part 45a of the tongue and above the shoulders 45c fall down onto its upper surfaces which retain the core support plate.

The metal cylinder 46 is crushed and deformed by compression or buckling inside the widened part of the cavity 43, the deformed part 46' of the tubular piece 46 being represented by dotted lines in FIG. 10.

Damping is thus obtained by absorption of energy, upon the drop of the lower internals, in the form of energy of compression of the cylinders 46 associated with each of the holding devices 42.

As may be seen in FIG. 11, instead of a solid tubular casing 46, a tubular casing 47 including through-holes 47' may be used. The effect of crushing the tubular casing 47, upon the drop of the lower internals, makes it possible to absorb some of the energy involved during the drop.

Figure 12:
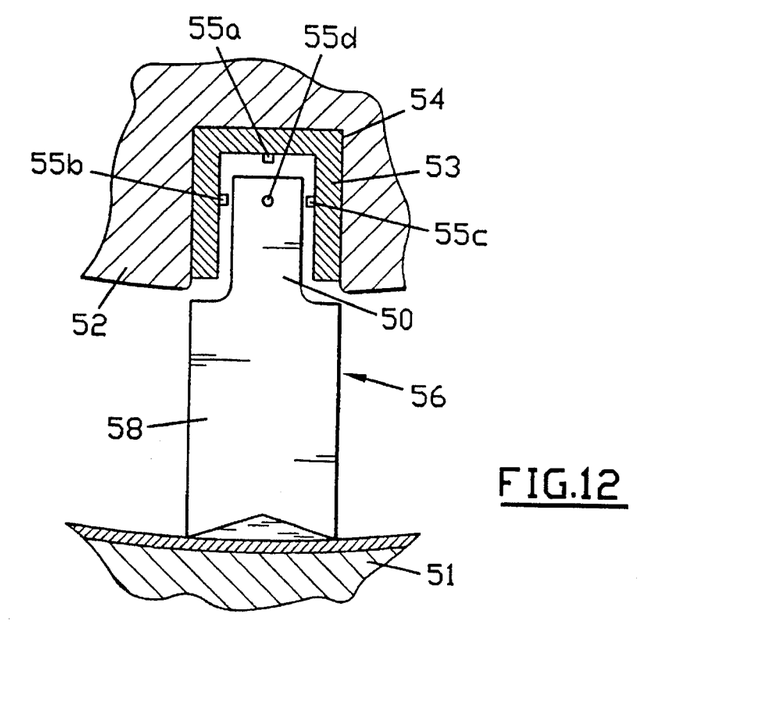
FIG. 12 is a sectional view, in a horizontal plane, of a key of a radial holding means according to the invention, in a measurement phase for adjusting the geometrical characteristics of a keyhole slot intended to interact with the key inside a cut-out.

FIG. 12 represents a holding device 56 of a nuclear reactor vessel according to the invention, including a key 58 integral with the inner surface of the wall of the vessel, including an end part 50 forming a tongue of substantially parallelepipedal shape, the longitudinal direction of which is parallel to the axis of the vessel.

The key 58 forming the male part of a holding device 56 for the internals of the nuclear reactor vessel including a support plate 52 has been represented, during a measurement and regulating operation necessary for carrying out the machining and the adjustment of a keyhole slot which has to be inserted into a cut-out 54 machined in the core support plate 52, in order to receive the tongue 50 of the key 58 of the holding device 56.

In order to carry out measurements of the clearances necessary for the machining of the keyhole slots which will be inserted into each of the cut-outs 54 in the core support plate 52, a standard keyhole slot 53 having standard dimensions is first arranged in each of the cut-outs 54.

The lower internals are placed in their service position inside the vessel, taking care to mark their position in terms of orientation about the axis of the vessel.

The provisional keyhole slots 53 are equipped with distance sensors, 55a, 55b, 55c and 55d on four faces opposite the faces of the tongue 50.

The distances, $\Delta x$ in the circumferential direction, $\Delta y$ in the radial direction and $\Delta z$ in the vertical direction, between the sensors 55a, 55b, 55c and 55d and the corresponding faces of the tongue 50 are measured.

The operation is carried out simultaneously for each of the holding devices 56 arranged around the core support plates 52 of the lower internals.

The measurements are transmitted and recorded in real time by a computer located outside the nuclear reactor vessel.

The measurements are used to determine the dimensions and sizes of each of the keyhole slots to be placed in each of the cut-outs 54.

The keyhole slots are machined and put into place and the lower internals are placed back inside the vessel, taking care to maintain their original orientation about the axis of the vessel. Because the keyhole slots have been machined as a function of the measurements carried out previously, the clearances both in the circumferential direction and in the radial direction have the optimum values in order to hold the lower internals effectively.

The keyhole slots have been made accurately and the clearances have been respected without intervention by an operator inside the vessel.

It is quite obvious that the vertical clearances may also be measured by distance sensors, during the phase of presenting the lower internals, in order to adjust the dimension of those parts of the keyhole slots intended to bear on the parts for supporting the keys.

The adjustment and installation of the internals in the vessel may therefore be carried out without the presence of an operator inside the vessel.

Vessels may therefore be designed without a manhole in the central part of their bottoms.

The vessel according to the invention thus includes means of holding in the radial, circumferential and axial directions which have a simple shape and a small overall size. These devices produce only a small head loss and a slight disturbance to the stream of coolant flowing around the lower internals.

The number of holding devices, each formed by an assembly comprising a key and a keyhole slot, may be other than six and, for example, should the need arise, eight assemblies distributed around the core support plate may be used. It is preferable to provide an asymmetrical arrangement of the holding assemblies around the core support plate so as to improve the flow of the coolant and, especially, to prevent the creation of vortices at the bottom of the vessel. However, it is necessary to provide at least three holding devices.

The keys of the holding assemblies may have a shape other than that which has been described and, in particular, the tongue which is inserted into the keyhole slot may have a prismatic shape different from the parallelepipedal shape which has been described.

The keyhole slots may be produced in a way completely different from that which has been described.

These keyhole slots may be coated with wear-resistant layers of a hard material such as a Stellite. The keyhole slots may also be formed by a single layer deposited inside a cut-out machined in the peripheral part of the core support plate.

In the case where the core support plate could be machined very accurately, it would be possible to provide holding by means of the tongues of the keys integral with the wall of the vessel, these being engaged in cut-outs machined in the peripheral part of the core support plate.

The invention applies in the case of any pressurized-water nuclear reactor which includes a vessel in which lower internals including a nuclear-reactor core support plate are arranged.

I claim:

1. Vessel of a pressurized-water nuclear reactor, including a generally cylindrical wall which has a vertical axis in a service position of the vessel, a lower end of said vessel being closed by a domed bottom head and containing a cylindrical barrel arranged coaxially with respect to the vessel and integral with a very thick core support plate at its lower part, the barrel and the core support plate which form lower internals of the reactor vessel being held in directions perpendicular to the axis of the vessel and, in the event of rupture of the barrel, by holding means in engagement with the core support plate, wherein the holding means include at least three assemblies distributed around the periphery of the core support plate, each of said assemblies comprising:

(a) a key fixed onto the inner surface of the wall, at the level of the core support plate, and including a prismatic end part extending axially of the vessel; and (b) a cut-out in a peripheral part of the core support plate which is open to the exterior in order to receive, with clearance, the end internal part of the key, said cut-out being delimited by an upper surface perpendicular to the axis of the vessel and machined in the core support plate for retention of the core support plate in the event of a drop of the lower internals.

2. Vessel according to claim 1, wherein a keyhole slot is fixed inside the cut-out in the peripheral part of the core support plate.

3. Nuclear reactor vessel according to claim 2, wherein the keyhole slot includes a U-shaped profiled part extending in the direction of the axis of the vessel and a planar part substantially parallel to the faces of the core support plate and perpendicular to the axis of the vessel, the end part of the key holding the core support plate circumferentially and radially by means of the internal faces of the profiled part of the keyhole slot and supporting the core support plate and the internals by means of a face of the planar part of the keyhole slot directed towards the inside of the cut-out.

4. Vessel according to any one of claims 1 to 3, wherein the key includes a first end part intended to be engaged, with a clearance, in a cut-out in the core support plate and a second end part wider than said first end part in a circumferential direction of the core support plate so as to define shoulders plumb with the lower surface of the core support plate in order to hold the lower internals in the event of rupture of the core barrel, by the addition of an end surface of said first end part of the key arranged beneath the upper surface of the cut-out in the external edge of the core support plate.

5. Vessel according to any one of claims 1 to 3, wherein the key further includes an axial cavity of cylindrical overall shape, said cavity including a part emerging on the upper surface of the key and having a diameter greater than a remaining part of the cavity, into which cavity is inserted a metal tubular damping piece having an axial length greater than the depth of the cavity so as to project above the upper surface of the key and plumb with the upper surface of the cut-out between which a part of the keyhole slot is fixed, so as to damp, by absorption of compression energy of the tubular piece, the drop of the reactor internals.

6. Vessel according to claim 5, wherein the tubular damping piece includes a wall penetrated by openings.

7. Nuclear reactor vessel according to any of claims 1 to 3, wherein a part of the key located outside the cut-out in the core support plate includes, at its upper end and at its lower end, profiled surfaces in order to limit the head loss of the coolant flowing in the nuclear reactor vessel, in an annular space between the inner surface of the wall of the vessel and internals.

8. Nuclear reactor vessel according to any one of claims 1 to 3, wherein the holding means include six assemblies distributed around the periphery of the core support plate, each of said assemblies including a key and a cut-out in the external edge of the core support plate.

9. Nuclear reactor vessel according to claim 8, wherein the assemblies of the holding means are distributed asymmetrically about the axis of the wall of the vessel.

10. Method of adjusting the means for holding lower internals of a nuclear reactor vessel, said method conaprising the steps of:

(a) arranging a provisional keyhole slot in cut-outs in an external edge of a core support plate, said provisional keyhole slot having standard dimensions and being equipped with distance measurement devices on internal faces intended to be directed toward corresponding faces of an end part of a key;

(b) arranging the internals inside the nuclear reactor vessel, the wall of which carries keys, so as to engage each of the keyhole slots on an end part of the key;

(c) measuring of the distance between the measurement devices and faces opposite the end part of the key;

(d) picking up and recording the measurement signals outside the vessel;

(e) calculating the dimensions of keyhole slots from the measurements signals to obtain defined clearances between the faces of the end part of the keys and corresponding faces of the keyhole slots;

(f) making keyhole slots having the desired dimensions;

(g) fixing the keyhole slots inside the cut-outs in the core support plate; and (h) placing the lower internals inside the nuclear reactor vessel.

* * * * *